H. E. PARKER.
CONVERTIBLE SLEIGH OR GO-CART.
APPLICATION FILED FEB. 3, 1908.

909,211.

Patented Jan. 12, 1909.

Witnesses Fig. 5.  Inventor
Ray D. Tolman. Harry E. Parker.
Penelope Cromberbach. By Rufus B. Fowler
Attorney

UNITED STATES PATENT OFFICE.

HARRY E. PARKER, OF WINCHENDON, MASSACHUSETTS.

CONVERTIBLE SLEIGH OR GO-CART.

No. 909,211. Specification of Letters Patent. Patented Jan. 12, 1909.

Application filed February 3, 1908. Serial No. 413,956.

*To all whom it may concern:*

Be it known that I, HARRY E. PARKER, a citizen of the United States, residing at Winchendon, in the county of Worcester and Commonwealth of Massachusetts, have invented a new and useful Improvement in Convertible Sleighs or Go-Carts, of which the following is a specification, accompanied by drawings forming a part of the same, in which—

Figure 1:
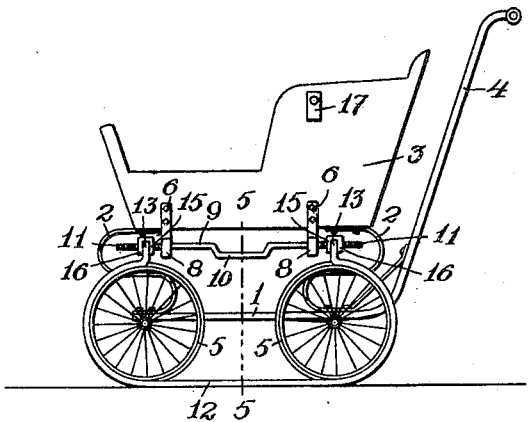
Figure 2:
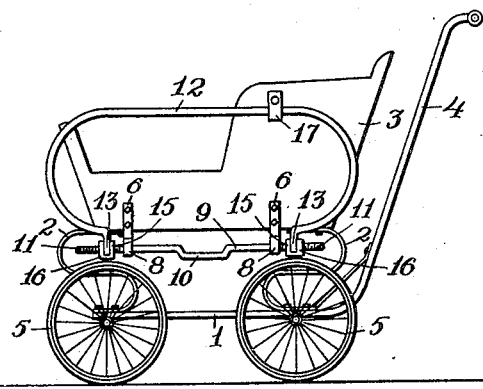
Figure 3:
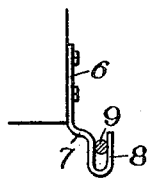
Figure 4:
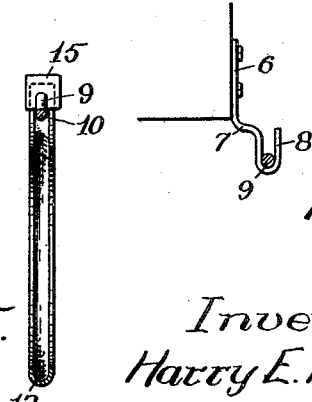

Figure 1 is a side view of the convertible sleigh or go cart arranged to be used as a sleigh. Fig. 2 is a side view of the same arranged to be used as a go cart. Figs. 3 and 4 are side views of one of the supporting brackets for the runners, showing different positions of the supporting rod, and Fig. 5 is a detached and central vertical sectional view of the runner.

Similar reference figures refer to similar parts in the different views.

My invention relates to go carts or other wheeled vehicles provided with runners arranged to be attached to the wheels of said vehicles to allow them to be used as sleds or sleighs, and it consists in the construction and arrangement of parts as hereinafter described and pointed out in the annexed claims.

Referring to the accompanying drawings 1 denotes the framework of the vehicle supporting on springs 2, a body 3, and provided with a handle 4 to assist in the propulsion of the vehicle. The framework 1 is supported on wheels 5 in the usual manner.

Attached to either side of the body 3 of the go cart are brackets 6, preferably extending below the bottom of the body 3, and provided with offset bends 7 and supporting hooks 8, as shown in Figs. 3 and 4. Supported horizontally to the vehicle body and on each side thereof by the hooks 8 is a rod 9, provided near its center with a crank handle 10 for convenience in rotating the rod 9, and at its ends with right and left hand screw threads 11. The runner 12 is preferably formed of iron which is crescent shaped in cross section, as shown in Fig. 5, and it is shaped to inclose the outer halves of the periphery of each wheel, and to extend between and below the wheel, with its ends bent to form lugs 13 provided with holes through which the screw threaded ends of the rod 9 pass loosely. Embracing the lugs 13 are U-shaped clips 15, the outer members of which are screw threaded, forming nuts 16 which engage the screw threaded ends 11 of the crank rod 9. The rotation of the rod 9 will cause the nuts 16 to approach or recede from each other by means of the right and left hand screw threads, thereby drawing together or spreading the ends of the runner 12, and pushing it out of contact with the sides of the wheels.

As shown in Fig. 2, the runners 12 are turned upward into contact with the body 3, when not in use, and held there by any suitable means, in this instance by the button 17. When the runner 12 is in the inoperative position, the rod 9 rests upon the bottom of the hook 8, as shown in Fig. 4. When it is desired to convert the go cart into a sleigh the runner 12 is released and swung downward. At this time the wheels which are to receive the runner are raised slightly and the runner allowed to swing beneath them, with the weight of the runner supported by the rod 9. The wheels 5 are then lowered and brought into contact with the concave face of the runner 12. By this operation the rod 9 is lifted slightly in the hooks 8 and assumes the position shown in Fig. 3. The lugs 13 are then drawn together by rotation of the rod 9 to clamp the runner upon the wheels 5, and to prevent its displacement. In this position the runner is supported entirely by contact with the wheels 5. To remove the runner the lugs 13 are spread slightly, the wheels raised to allow the runner 12 to separate itself from them, and the rod 9 again to be supported by the hooks 8, as shown in Fig. 4, when the runner may be turned upward on the rod 9 and fastened by the button 17, or if desired, the runner may be entirely removed by withdrawing the rod 9 from the open hooks 8.

I claim,

1. In a vehicle of the class described, the combination with a detachable runner, supported in its operative position by contact with the tops of the wheels of the vehicle, a rod connecting the ends of the runner, said rod supported by the runner in its operative position and arranged to be supported from the vehicle, thereby supporting the runner in its inoperative position.

2. In a vehicle of the class described, the combination with a runner supported from the tops of the wheels of the vehicle in its operative position, means for supporting said runner from the vehicle in its inoperative position, said supporting means arranged to permit a slight vertical movement of the runner with reference to the body of the vehicle in passing from one position to the other.

3. In a vehicle of the class described, the combination with a runner arranged to contact with the wheels of the vehicle, a rod connecting the ends of said runner, means for moving each end longitudinally on said rod, brackets attached to the vehicle for supporting said rod, said brackets arranged to allow the downward movement of said runner when it is released from contact with the wheels of the vehicle by the movement of its ends.

4. In a vehicle of the class described, the combination with a runner arranged to be supported in its operative position from the tops of the wheels of said vehicle, a rod connecting the ends of said runner and arranged to support said runner when said runner is not in its operative position, supported from the tops of said wheels.

5. In a vehicle of the class described, the combination with a detachable runner having its ends arranged to contact with the tops of the wheels of the vehicle when said runner is in its operative position, a rod connecting said ends, and means attached to the vehicle for supporting said rod when said runner is not in its operative position.

6. In a vehicle of the class described, the combination with a runner, means for adjusting the ends of said runner to bring them into contact with the tops of the wheels of the vehicle, and means for supporting said runner from the vehicle during said adjustment.

HARRY E. PARKER.

Witnesses:
FRED C. HANSCOM,
JOSIE T. O'DONNELL.